(12) United States Patent
Choi et al.

(10) Patent No.: US 10,464,395 B2
(45) Date of Patent: Nov. 5, 2019

(54) METHOD FOR CONTROLLING AIR CONDITIONER COMPRESSOR

(71) Applicant: HYUNDAI MOTOR COMPANY, Seoul (KR)

(72) Inventors: Kwon Hyoung Choi, Suwon-si (KR); Jin Hyung Lee, Seoul (KR); Hyun Woo Shin, Hwaseong-si (KR); Wan Je Cho, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 344 days.

(21) Appl. No.: 15/367,824

(22) Filed: Dec. 2, 2016

(65) Prior Publication Data

US 2018/0056754 A1 Mar. 1, 2018

(30) Foreign Application Priority Data

Aug. 26, 2016 (KR) .................... 10-2016-0109289

(51) Int. Cl.
*B60H 1/32* (2006.01)

(52) U.S. Cl.
CPC ......... *B60H 1/3208* (2013.01); *B60H 1/3214* (2013.01); *B60H 2001/3241* (2013.01); *B60H 2001/3248* (2013.01); *B60H 2001/3255* (2013.01); *B60H 2001/3266* (2013.01); *B60H 2001/3272* (2013.01)

(58) Field of Classification Search
CPC ....................... B60H 1/3214; B60H 2001/3272
See application file for complete search history.

(56) References Cited

U.S. PATENT DOCUMENTS

| 6,145,325 | A | * | 11/2000 | Hanselmann | ........ | B60H 1/3214 |
| | | | | | | 62/192 |
| 9,279,434 | B2 | * | 3/2016 | Ehrhardt | ................. | F15B 21/08 |
| 2004/0098984 | A1 | * | 5/2004 | Duell | .................... | E02F 9/2235 |
| | | | | | | 60/431 |

FOREIGN PATENT DOCUMENTS

| JP | H05-157380 A | 6/1993 |
| JP | H08-150829 A | 6/1996 |
| KR | 10-2004-0003702 A | 1/2004 |
| KR | 10-2005-0057850 A | 6/2005 |
| KR | 10-2006-0077215 A | 7/2006 |
| KR | 10-2007-0059347 A | 6/2007 |
| KR | 10-2015-0000569 A | 1/2015 |

OTHER PUBLICATIONS

Korean Office Action issued in Application No. 10-2016-0109289 dated May 23, 2017.
Korean Office Action issued in Application No. 10-2016-0109289 dated Nov. 15, 2017.

* cited by examiner

*Primary Examiner* — Filip Zec
(74) *Attorney, Agent, or Firm* — Morgan, Lewis & Bockius LLP

(57) ABSTRACT

A method for controlling an air conditioner compressor includes: driving the air conditioner compressor for a first time at a first revolutions per minute (RPM) smaller than a minimum lubrication demand RPM when a lubrication demand RPM of the air conditioner compressor is smaller than the minimum lubrication demand RPM; and driving the air conditioner compressor for a second time at the minimum lubrication demand RPM when the lubrication demand RPM of the air conditioner compressor is smaller than the minimum lubrication demand RPM after the first time elapse.

8 Claims, 3 Drawing Sheets

METHOD FOR CONTROLLING AIR CONDITIONER COMPRESSOR

CROSS-REFERENCE TO RELATED APPLICATION

This application is based on and claims the benefit of priority to Korean Patent Application No. 10-2016-0109289, filed on Aug. 26, 2016 in the Korean Intellectual Property Office, the disclosure of which is incorporated herein in its entirety by reference.

TECHNICAL FIELD

The present disclosure relates to a method for controlling an air conditioner compressor, and more particularly, to a technology for reducing an operation load of an air conditioner compressor.

BACKGROUND

Generally, an object of a car air conditioning system is to maintain a comfortable indoor condition to improve ride comfort of a driver and a passenger. In the car air conditioning system, an electronic control unit (ECU) operates an air conditioner (A/C) compressor in connection with a blower by a manipulation of an A/C air conditioning switch of a user, thereby using the A/C compressor in hot summer or in the case in which indoor humidity needs to be controlled. The A/C compressor is operated by the manipulation of the user in principle, but is also operated to control an indoor temperature in a case corresponding to a temperature condition set by the user in a vehicle in which a full auto temperature control (FATC) system is mounted.

Currently, in the operation of the A/C compressor, when only a refrigerant pressure condition is satisfied regardless of a driving condition of an engine in the case in which the driver or the passenger operates an A/C switch or operates a front glass moisture removing mode, the ECU engages the A/C compressor with the engine to compress an A/C refrigerant through the A/C compressor. In this case, a predetermined amount of fuel needs to be injected in order for the engine to maintain a predetermined revolutions per minute (RPM), such that fuel consumption may be deteriorated.

That is, when the A/C compressor is operated in an idle rotation region after warming up the engine in a vehicle, fuel is further consumed by 60% as compared with the case in which the A/C compressor is not engaged with the engine. In this case, it is assumed that the engine is operated in the idle rotation region, and a ratio of an amount of fuel consumed by the A/C compressor to a total amount of sprayed fuel will be relatively reduced in the case in which the engine is operated under a general driving condition. However, when the vehicle is driven in summer in a city in which traffic congestion is severe, a fuel consumption difference depending on turn-on/off of the AC will be large.

SUMMARY

The present disclosure has been made to solve the above-mentioned problems occurring in the prior art while advantages achieved by the prior art are maintained intact.

An aspect of the present disclosure provides a method for controlling an air conditioner compressor that is capable of reducing power consumption by controlling an operation revolutions per minute (RPM) of the air conditioner compressor so that the air conditioner compressor is driven at a minimum lubrication demand RPM or more when the air conditioner compressor is driven at the minimum lubrication demand RPM or less of the air conditioner compressor, such that an area of a time in which the air conditioner compressor is driven at a low speed exceeds a limit of the area of the time in which the air conditioner compressor is driven at the low speed and that is capable of stably controlling a temperature.

Other objects and advantages of the present disclosure may be understood by the following description and will be more clearly appreciated by exemplary embodiments of the present disclosure. It may be easily appreciated that objects and advantages of the present disclosure may be realized by means mentioned in the claims and a combination thereof.

According to an exemplary embodiment of the present disclosure, a method for controlling an air conditioner compressor includes: driving the air conditioner compressor for a first time at a first RPM smaller than a minimum lubrication demand RPM when a lubrication demand RPM of the air conditioner compressor is smaller than the minimum lubrication demand RPM; and driving the air conditioner compressor for a second time at the minimum lubrication demand RPM when the lubrication demand RPM of the air conditioner compressor is smaller than the minimum lubrication demand RPM after the first time elapse.

The lubrication demand RPM of the air conditioner compressor may be determined by a pressure of a refrigerant, a speed of a blower, or a speed of a vehicle demanded in connection with a driving condition of an engine.

The minimum lubrication demand RPM may be an RPM of the air conditioner compressor at which a problem does not occur in lubrication of oil in the case which the air conditioner compressor is continuously driven for a long period of time.

The first time may be determined by an external temperature and a difference between the first RPM and the minimum lubrication demand RPM.

The step of driving the air conditioner compressor for the first time at the first RPM may be performed when an external temperature is a first temperature or more.

The method for controlling an air conditioner compressor may further include, after the step of driving the air conditioner compressor for the second time at the minimum lubrication demand RPM, driving the air conditioner compressor at the lubrication demand RPM.

In the step of driving the air conditioner compressor for the second time at the minimum lubrication demand RPM, an amount of external air introduced into a vehicle or a use condition of a heater may be corrected.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Advantages and features of the present disclosure and methods accomplishing them will become apparent from exemplary embodiments described below in detail with reference to the accompanying drawings. However, the present disclosure is not limited to exemplary embodiments described herein, but may be implemented in other forms. These exemplary embodiments are provided in order to describe the present disclosure in detail so that those skilled in the art to which the present disclosure pertains may easily practice the spirit of the present disclosure.

In the accompanying drawings, exemplary embodiments of the present disclosure are not limited to illustrated specific forms, but are exaggerated for the purpose of clarity. Although specific terms have been used in the present disclosure, they are used in order to describe the present disclosure and are not used in order to limit the meaning or the scope of the present disclosure, which is disclosed in the claims.

In the present specification, a term 'and/or' is used as the meaning including at least one of components arranged before and after the term. In addition, terms 'connected/coupled' are used as the meaning including that any component is directly connected to another component or is indirectly connected to another component through the other component. Unless explicitly described to the contrary, a singular form includes a plural form in the present specification. In addition, components, steps, operations, and elements mentioned by terms 'include' or 'including' used in the present specification mean the existence or addition of one or more other components, steps, operations, and elements.

Hereinafter, an exemplary embodiment of the present disclosure will be described in detail with reference to the accompanying drawings.

Figure 1:
FIG. 1 is a block diagram for describing an apparatus for controlling an air conditioner compressor according to an exemplary embodiment of the present disclosure.

FIG. 1 is a block diagram for describing an apparatus for controlling an air conditioner compressor according to an exemplary embodiment of the present disclosure.

Referring to FIG. 1, the apparatus for controlling an air conditioner compressor according to an exemplary embodiment of the present disclosure allows the air conditioner compressor to be driven at a minimum lubrication demand revolutions per minute (RPM) or less, and recovers lubrication in a perturbation portion of the air conditioner compressor by driving the air conditioner compressor at a minimum lubrication demand RPM or more when an area of a time in which the air conditioner compressor is driven at a low speed exceeds a limited value of the area of the time in which the air conditioner compressor is driven at the low speed.

The apparatus for controlling an air conditioner compressor according to an exemplary embodiment includes a lubrication rise decider 10, a lubrication rise controller 20, and a compressor RPM controller 30.

The lubrication rise decider 10 calculates a value of the area of the time in which the air conditioner compressor is driven at the low speed, and allows the value of the area of the time in which the air conditioner compressor is driven at the low speed to compare with a limited value (a set value) of the area of the time in which the air conditioner compressor is driven at the low speed.

The lubrication rise controller 20 controls a driving RPM of the air conditioner compressor to rise by a minimum lubrication demand RPM, and compares a time in which the diving RPM of the air conditioner compressor is controlled to rise by the minimum lubrication demand RPM with an allowable value (a set value for each external air temperature).

Here, when the time in which the diving RPM of the air conditioner compressor is controlled to rise exceeds the allowable value, the lubrication rise controller 20 ends a process of controlling the driving RPM of the air conditioner compressor to rise.

The compressor RPM controller 30 controls a temperature control door (or a temperature door) and suppresses the use of a positive temperature coefficient (PTC) heater in order to prevent a drop in a temperature due to an increase in an RPM of the air conditioner compressor and prevent the use of the PTC heater from being used at the time of performing a lubrication rise control of the air conditioner compressor.

Here, the temperature control door (or the temperature door) and the PTC heater are electrical heating elements, and when electricity is applied to a resistor having a resistance value rapidly increased at a specific temperature or more, such as a barium titanate ($BaTiO_3$)-based material, to generate heat, the temperature control door (or the temperature door) and the PTC heater limit an increase in their resistance values, such that temperatures of the temperature control door (or the temperature door) and the PTC heater are substantially constant in spite of a variation in an external air temperature or power. The temperature control door (or the temperature door) and the PTC heater, which are magnetic control heaters that have three actions of a heating element, a temperature controller, and a power controller and do not have a risk of overheat, have been widely used in an air conditioner, a drier, a warmer, a heating equipment, and the like.

The various embodiments disclosed herein, including embodiments of the apparatus for controlling an air conditioner compressor and/or elements thereof, can be implemented using one or more processors coupled to a memory (or other non-transitory machine readable recording medium) storing computer-executable instructions for causing the processor(s) to perform the functions described above including the functions described in relation to the lubrication rise decider 10, the lubrication rise controller 20, and the compressor RPM controller 30.

The apparatus for controlling an air conditioner compressor according to an exemplary embodiment of the present disclosure described above reduces power consumption, stably controls a temperature, and improve comfort of the air conditioner compressor.

Figure 2:
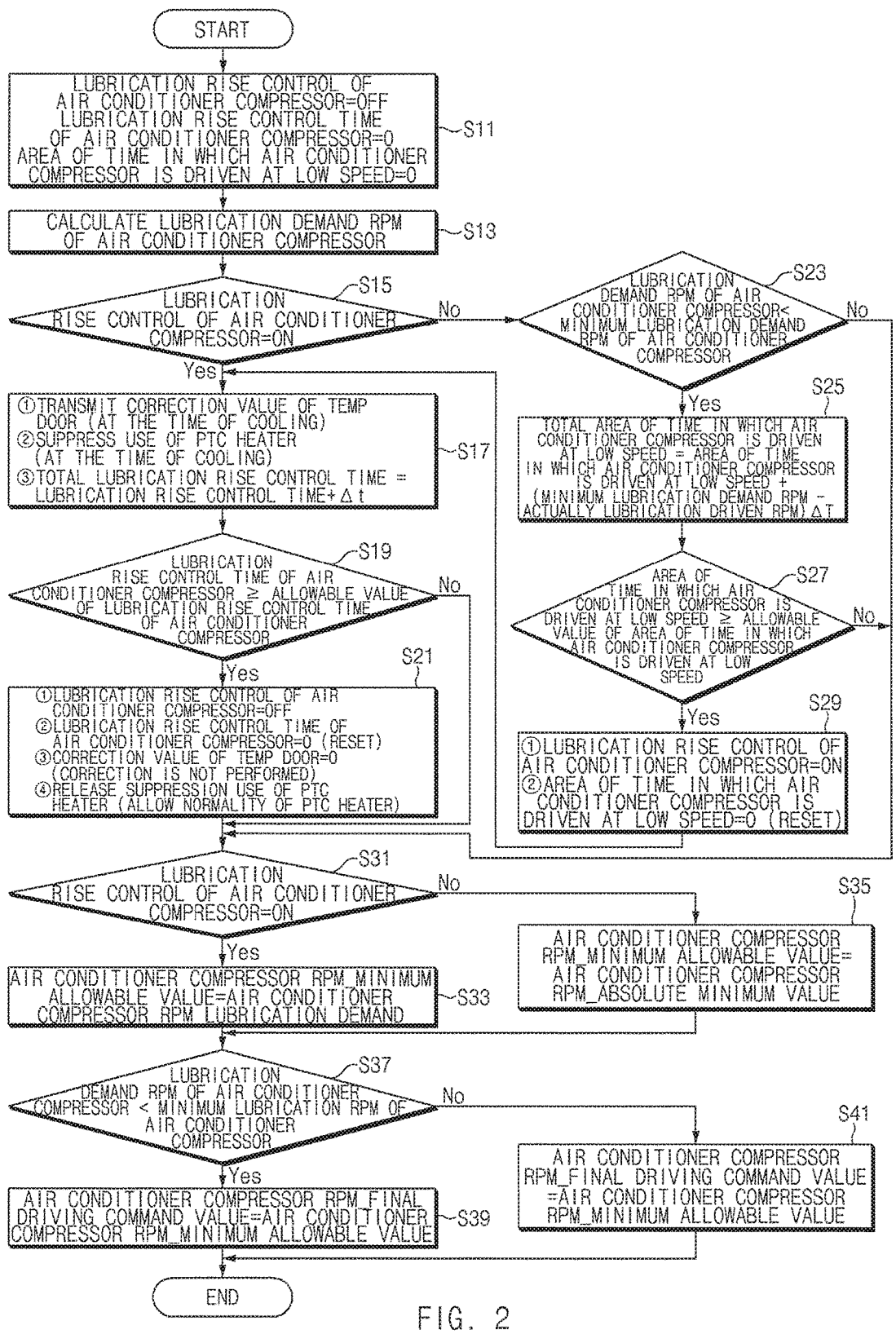
FIG. 2 is a flow chart for describing a method for controlling an air conditioner compressor according to an exemplary embodiment of the present disclosure in detail.

FIG. 2 is a flow chart for describing a method for controlling an air conditioner compressor according to an exemplary embodiment of the present disclosure in detail.

Referring to FIG. 2, when the lubrication rise control of the air conditioner compressor is in an off-state, a time for the lubrication rise control is 0, and the time area in which the air conditioner compressor is driven at the low speed is 0, the apparatus for controlling an air conditioner compressor calculates a lubrication demand RPM of the air conditioner compressor (S11 and S13).

Here, the lubrication demand RPM of the air conditioner compressor may be determined by a pressure of a refrigerant, a speed of a blower, or a speed of a vehicle demanded in connection with a driving condition of an engine of the vehicle.

Then, the apparatus for controlling an air conditioner compressor decides whether or not the lubrication rise control of the air conditioner compressor is in an on-state (S15).

Then, the apparatus for controlling an air conditioner compressor suppresses the use of the PTC heater (at the time of cooling) and controls a correction value of the temperature control door (at the time of cooling) and controls a lubrication rise control time (total lubrication rise control time) of the air conditioner compressor (S17), in the case in which the lubrication rise control of the air conditioner compressor is in the on-state.

For example, Total lubrication rise control time may be calculated by adding lubrication rise control time and time (Δt)

Here, the correction value of the temperature control door (or the temperature door) is controlled in order to prevent a temperature in the vehicle from falling in the case in which the lubrication rise control of the air conditioner compressor is in the on-state, the lubrication rise controller controls the lubrication rise of the air conditioner compressor to temporally increase an RPM of the air conditioner compressor, and suppresses the use of the PTC heater since the temperature in the vehicle again rises when the RPM of the air conditioner compressor is reduced after being temporally increased.

Then, the apparatus for controlling an air conditioner compressor compares a lubrication rise control time and an allowable value (a limited value) of the lubrication rise control time with each other (S19).

Then, the apparatus for controlling an air conditioner compressor allows the lubrication rise control of the air conditioner compressor to be in an off-state and resets the lubrication rise control time to 0 (S21), in the case in which the lubrication rise control time is larger than or equal to the allowable value of the lubrication rise control time. Additionally, the apparatus for controlling an air conditioner compressor may control the correction value of the temperature control door (or the temperature door) to be 0 and use the PTC heater, after it resets the lubrication rise control time to 0.

However, when the apparatus for controlling an air conditioner compressor allows the lubrication rise control of the air conditioner compressor to be in an off-state in S15, the apparatus for controlling an air conditioner compressor compares the lubrication demand RPM of the air conditioner compressor and the minimum lubrication demand RPM (a minimum lubrication required RPM) of the air conditioner compressor with each other (S23).

Then, the apparatus for controlling an air conditioner compressor calculates an area of a total time in which the air conditioner compressor is driven at a low speed (S25), in the case in which the lubrication demand RPM of the air conditioner compressor is smaller than the minimum lubrication demand RPM of the air conditioner compressor.

For example, the area of the total time in which the air conditioner compressor is driven at the low speed may be calculated by multiplying a value obtained by subtracting an actually lubrication driven RPM (for example, 800 rpm) from the minimum lubrication demand RPM (for example, 1000 rpm) of the air conditioner compressor by a time (for example, ten minutes).

Then, the apparatus for controlling an air conditioner compressor compares the area of the time in which the air conditioner compressor is driven at the low speed with the allowable value of the area of the time in which the air conditioner compressor is driven at the low speed (S27).

Next, the apparatus for controlling an air conditioner compressor allows the lubrication rise control of the air conditioner compressor to be in on-state and resets the area of the time in which the air conditioner compressor is driven at the low speed to 0 (S29) when the area of the time in which the air conditioner compressor is driven at the low speed is larger than or equal to the allowable value of the area of the time in which the air conditioner compressor is driven at the low speed.

Then, the apparatus for controlling an air conditioner compressor again decides whether or not the lubrication rise control of the air conditioner compressor is in an on-state (S31), after S21.

Then, the apparatus for controlling an air conditioner compressor applies the lubrication demand RPM of the air conditioner compressor (S33) when the lubrication rise control of the air conditioner compressor is currently in the on-state, and applies the minimum lubrication RPM of the air conditioner compressor (S35) when the lubrication rise control of the air conditioner compressor is currently in an off-state.

Then, the apparatus for controlling an air conditioner compressor compares the lubrication demand RPM of the air conditioner compressor and the minimum lubrication RPM of the air conditioner compressor with each other (S37).

Then, the apparatus for controlling an air conditioner compressor applies the minimum lubrication RPM of the air conditioner compressor (S39) when the lubrication demand RPM of the air conditioner compressor is smaller than the minimum lubrication RPM of the air conditioner compressor, and applies the lubrication demand RPM of the air conditioner compressor (S41) when the lubrication demand RPM of the air conditioner compressor is larger than the minimum lubrication RPM of the air conditioner compressor.

Figure 3:
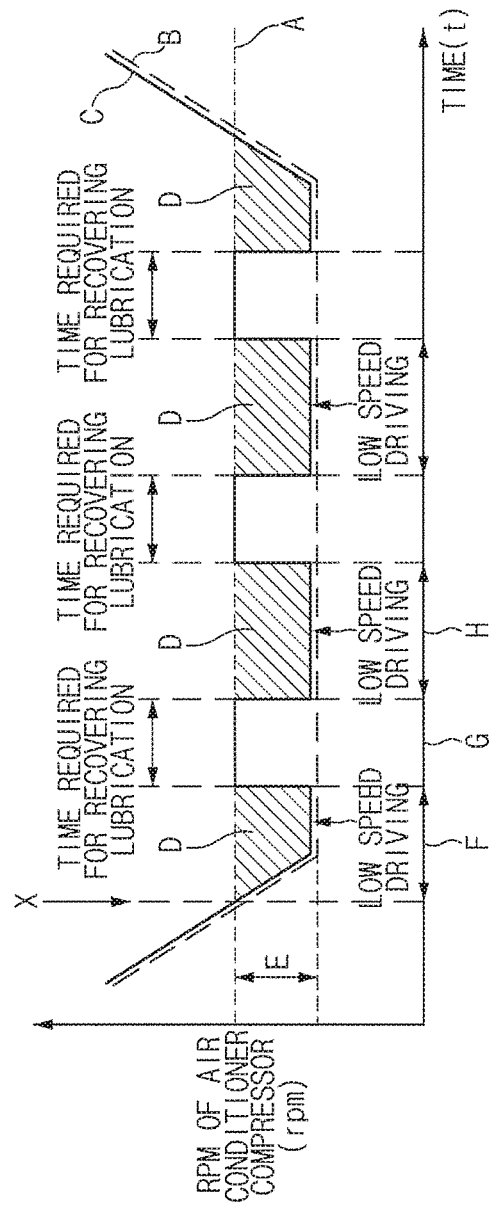
FIG. 3 is a view for describing a method in which the apparatus for controlling an air conditioner compressor according to an exemplary embodiment of the present disclosure is operated depending on a time and a revolutions per minute (RPM) of an air conditioner compressor.

FIG. 3 is a view for describing a method in which the apparatus for controlling an air conditioner compressor according to an exemplary embodiment of the present disclosure is operated depending on a time and a revolutions per minute (RPM) of an air conditioner compressor.

The method in which the apparatus for controlling an air conditioner compressor is operated depending on the time (t) and the RPM will be described with reference to FIG. 3.

That is, this technology is a technology of comparing a minimum lubrication demand RPM A of the air conditioner compressor and a lubrication demand RPM B of the air conditioner compressor with each other to control a lubrication driving RPM C of the air conditioner compressor as illustrated in FIG. 3.

In detail, the apparatus for controlling an air conditioner compressor according to an exemplary embodiment of the present disclosure assumes that the minimum lubrication demand RPM A is 1000 rpm, allows the air conditioner compressor to be driven at the minimum lubrication demand RPM A or less, and may recover lubrication in a perturbation portion of the air conditioner compressor by driving the air conditioner compressor at the minimum lubrication demand RPM A or more when an area D of a time in which the air conditioner compressor is driven at a low speed exceeds a limited value (a set limited value) of the area D of the time in which the air conditioner compressor is driven at the low speed.

That is, the apparatus for controlling an air conditioner compressor may drive the air conditioner compressor for a first time F at a first RPM E smaller than the minimum lubrication demand RPM A (between the lubrication demand RPM B and the minimum lubrication demand RPM A) in the case in which the lubrication demand RPM B of the air conditioner compressor is smaller than the minimum lubrication demand RPM A on the basis of X of FIG. 3, and may drive the air conditioner compressor for a second time G at the minimum lubrication demand RPM A in the case in which the lubrication demand RPM B of the air conditioner compressor is smaller than the minimum lubrication demand RPM A after the first time F elapse.

Here, the first time F may be determined by an external temperature and a difference between the first RPM E and the minimum lubrication demand RPM A, and a process of driving the air conditioner compressor for the first time F at the first RPM E may be performed in the case in which the external temperature is a first temperature or more.

The apparatus for controlling an air conditioner compressor drives the air conditioner compressor at the lubrication demand RPM B after the second time G That is, The apparatus for controlling an air conditioner compressor drives the air conditioner compressor for a third time H at a second RPM between the lubrication demand RPM B and the minimum lubrication demand RPM A, after driving the air conditioner compressor for the second time G at the minimum lubrication demand RPM A (that is, after the second time G).

In addition, the apparatus for controlling an air conditioner compressor may correct an amount of external air introduced into the vehicle or a use condition of a heater in a process of driving the air conditioner compressor for the second time G at the minimum lubrication demand RPM A.

As described above, the present technology is a technology of controlling an operation RPM of the air conditioner compressor to reduce power consumption.

In addition, the present technology provides the apparatus for controlling an air conditioner compressor capable of stably controlling a temperature.

The method for controlling an air conditioner compressor according to an exemplary embodiment of the present disclosure as described above may be created by a computer program. In addition, codes and code segments configuring the computer program may be easily inferred by a computer programmer skilled in the related art. Further, the created computer program is stored in a computer-readable recording medium (information storing medium) and is read and executed by a computer to implement the method for controlling an air conditioner compressor according to an exemplary embodiment of the present disclosure. Further, the computer-readable recording medium includes all types of recording media that are readable by the computer.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for controlling an air conditioner compressor, the method comprising steps of:
   driving the air conditioner compressor for a first time at a first revolutions per minute (RPM) smaller than a minimum lubrication demand RPM when a lubrication demand RPM of the air conditioner compressor is smaller than the minimum lubrication demand RPM; and
   driving the air conditioner compressor for a second time at the minimum lubrication demand RPM when the lubrication demand RPM of the air conditioner compressor is smaller than the minimum lubrication demand RPM after the first time elapse.

2. The method according to claim 1, wherein the lubrication demand RPM of the air conditioner compressor is determined by a pressure of a refrigerant, a speed of a blower, or a speed of a vehicle demanded in connection with a driving condition of an engine.

3. The method according to claim 1, wherein the minimum lubrication demand RPM is an RPM of the air conditioner compressor at which a problem does not occur in lubrication of oil when the air conditioner compressor is continuously driven for a predetermined period of time.

4. The method according to claim 1, wherein the first time is determined by an, external temperature and a difference between the first RPM and the minimum lubrication demand RPM.

5. The method according to claim 1, wherein the step of driving the air conditioner compressor for the first time at the first RPM is performed when an external temperature rises above a first temperature.

6. The method according to claim 1, further comprising: after the step of driving the air conditioner compressor for the second time at the minimum lubrication demand RPM, driving the air conditioner compressor at the lubrication demand RPM.

7. The method according to claim 1, wherein in the step of driving the air conditioner compressor for the second time at the minimum lubrication demand RPM, an amount of external air introduced into a vehicle or a use condition of a heater is corrected.

8. A non-transitory, tangible, computer-readable storage media containing a program of instructions that causes a computer system having a controller running the program of instructions to implement the method of claim 1.

* * * * *